(12) United States Patent
Tao et al.

(10) Patent No.: US 11,046,154 B2
(45) Date of Patent: Jun. 29, 2021

(54) VEHICULAR LAMINATED GLASS

(71) Applicant: AGC Inc., Chiyoda-ku (JP)

(72) Inventors: Yukihiro Tao, Tokyo (JP); Reo Usui, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 16/706,942

(22) Filed: Dec. 9, 2019

(65) Prior Publication Data
US 2020/0114735 A1 Apr. 16, 2020

Related U.S. Application Data

(63) Continuation of application No. PCT/JP2018/027504, filed on Jul. 23, 2018.

(30) Foreign Application Priority Data

Jul. 26, 2017 (JP) .............................. JP2017-144514

(51) Int. Cl.
*B60J 1/00* (2006.01)
*B32B 17/10* (2006.01)
*B60J 3/00* (2006.01)
*B60J 1/02* (2006.01)

(52) U.S. Cl.
CPC ......... *B60J 1/002* (2013.01); *B32B 17/10339* (2013.01); *B60J 3/007* (2013.01); *B32B 2605/006* (2013.01); *B60J 1/02* (2013.01)

(58) Field of Classification Search
CPC ...... B60J 1/002; B60J 3/007; B32B 17/10339
USPC ......................................................... 428/34
See application file for complete search history.

(56) References Cited

U.S. PATENT DOCUMENTS

| | | | | |
|---|---|---|---|---|
| 4,555,434 | A * | 11/1985 | Kunert | B32B 17/10761 428/194 |
| 5,405,680 | A * | 4/1995 | Chang | C03C 17/22 428/212 |
| 6,156,397 | A * | 12/2000 | Stephenson | F21V 9/14 359/485.04 |
| 9,952,494 | B2 | 4/2018 | Tao et al. | |
| 2003/0096067 | A1* | 5/2003 | Hirose | G02B 6/0055 428/34 |

(Continued)

FOREIGN PATENT DOCUMENTS

WO  WO 2015/186668 A1  12/2015
WO  WO-2017111111 A1 *  6/2017 ............. G03B 21/62

*Primary Examiner* — Tahseen Khan
(74) *Attorney, Agent, or Firm* — Oblon, McClelland, Maier & Neustadt, L.L.P.

(57) ABSTRACT

A vehicular laminated glass in which a plurality of glass plates and an intermediate film disposed between the plurality of glass plates are stacked. The vehicular laminated glass includes a first region having a colored layer disposed along an upper edge of the vehicular laminated glass with reference to an orientation of a vehicle to which the vehicular laminated glass is attached, and a second region disposed lower than the first region. The first region includes a region A having a light scattering layer and a region B not having the light scattering layer. In the region A, a visible light transmittance is 0.7% to 32%, a visible light reflectance is 0.5% to 10%, a vehicle-inner side visible light diffuse reflectance is 3% to 45%, and the light scattering layer is arranged at a vehicle-inner side relative to the colored layer.

12 Claims, 3 Drawing Sheets

(56) References Cited

U.S. PATENT DOCUMENTS

| | | | |
|---|---|---|---|
| 2010/0255225 A1* | 10/2010 | Cording | C03C 17/3417 |
| | | | 428/34 |
| 2012/0269994 A1* | 10/2012 | Sybert | C08L 83/10 |
| | | | 428/34 |
| 2015/0300076 A1* | 10/2015 | Ayoub | E06B 3/66376 |
| | | | 362/311.01 |
| 2017/0031063 A1* | 2/2017 | Kim | C03C 17/34 |
| 2017/0205701 A1* | 7/2017 | Ide | G02B 5/0278 |
| 2018/0292587 A1* | 10/2018 | Kawamoto | C03C 17/3618 |

* cited by examiner

VEHICULAR LAMINATED GLASS

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2018/027504 filed on Jul. 23, 2018 and designating the U.S., which claims priority of Japanese Patent Application No. 2017-144514 filed on Jul. 26, 2017. The entire contents of the foregoing applications are incorporated herein by reference.

BACKGROUND OF THE INVENTION

1. Field of the Invention

The invention relates to a vehicular laminated glass.

2. Description of the Related Art

In a vehicular laminated glass, a belt-like shade band colored in green, blue, or the like may be formed along the upper side for the purpose of improving anti-glare property and heat shielding property. A transparent screen onto which an image can be projected and displayed without reducing the visibility of a background image seen through the transparent screen has attracted attention. International Publication No. 2015/186668 proposes applying a transparent screen to a shade band portion of an automotive windshield.

SUMMARY OF THE INVENTION

Technical Problem

International Publication No. 2015/186668 discloses a vehicular laminated glass in which a transparent screen is arranged in a shade band portion, but does not disclose a specific configuration such as a position at which the transparent screen is to be disposed in a cross section of the laminated glass. That is, there is no specific description in International Publication No. 2015/186668 regarding defects caused by external light and defects in display images, which are caused by the laminated glass when the laminated glass having the transparent screen arranged therein is actually attached as a windshield for a vehicle. For example, there have been concerns with regard to, e.g., how a portion having the transparent screen arranged therein appears to passengers or people outside of the vehicle when a display image is not displayed on the transparent screen, and how to determine the luminance for ensuring the visibility of a display image when the display image is displayed. More specifically, it is desired to specifically determine the conditions regarding image visibility, designs, and the like which are to be specified when a vehicular laminated glass arranged with a transparent screen is actually installed on a vehicle.

In view of the above problems, it is an object of the present invention to provide a vehicular laminated glass that has image visibility and anti-glare properties, and is excellent in design during non-projection, and alleviates noise light emitted to the outside of the vehicle described later.

Solution to Problem

In order to solve the above problem, the present invention provides a vehicular laminated glass in which a plurality of glass plates and an intermediate film disposed between the plurality of glass plates are stacked, the vehicular laminated glass including:
a first region having a colored layer disposed along an upper edge of the vehicular laminated glass with reference to an orientation of a vehicle to which the vehicular laminated glass is attached; and
a second region disposed lower than the first region,
wherein the first region includes:
a region A having a light scattering layer; and
a region B not having the light scattering layer,
in the region A, a visible light transmittance is 0.7% to 32%, a visible light reflectance is 0.5% to 10%, a vehicle-inner side visible light diffuse reflectance is 3% to 45%, and the light scattering layer is arranged at a vehicle-inner side relative to the colored layer.

Effect of Invention

According to the present invention, a vehicular laminated glass that is excellent in image visibility, anti-glare properties, and design and that alleviates noise light emitted to the outside of the vehicle is provided.

DETAILED DESCRIPTION OF THE PREFERRED EMBODIMENTS

The following explanation about configuration elements is made based on a typical embodiment of the present invention, but the present invention is not limited to such an embodiment. It should be noted that an expression "a range of A to B" includes the numerical values A and B (an upper limit value and a lower limit value).

Figure 1:
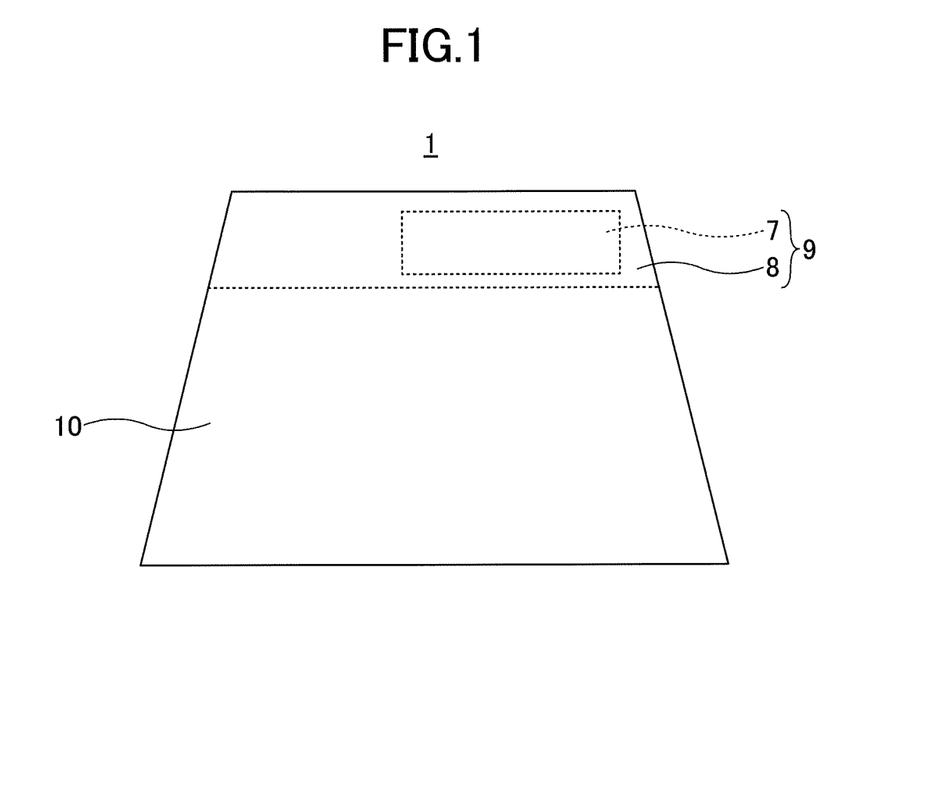
FIG. 1 is a front view illustrating an example of a vehicular laminated glass 1 according to an embodiment of the present invention.

FIG. 1 is a front view illustrating an example of a vehicular laminated glass 1 according to the present invention. The vehicular laminated glass 1 includes a first region 9 having a colored layer disposed along an upper side (upper edge) of the vehicular laminated glass 1 with reference to the orientation of a vehicle to which the vehicular laminated glass 1 is attached, and a second region 10 disposed below the first region 9. The first region 9 includes a region A7 (denoted with reference symbol 7 in FIG. 1 and FIG. 4) having a light scattering layer used for displaying an image and a region B8 (denoted with reference symbol 8 in FIG. 1 and FIG. 4) not having a light scattering layer.

Figure 2:
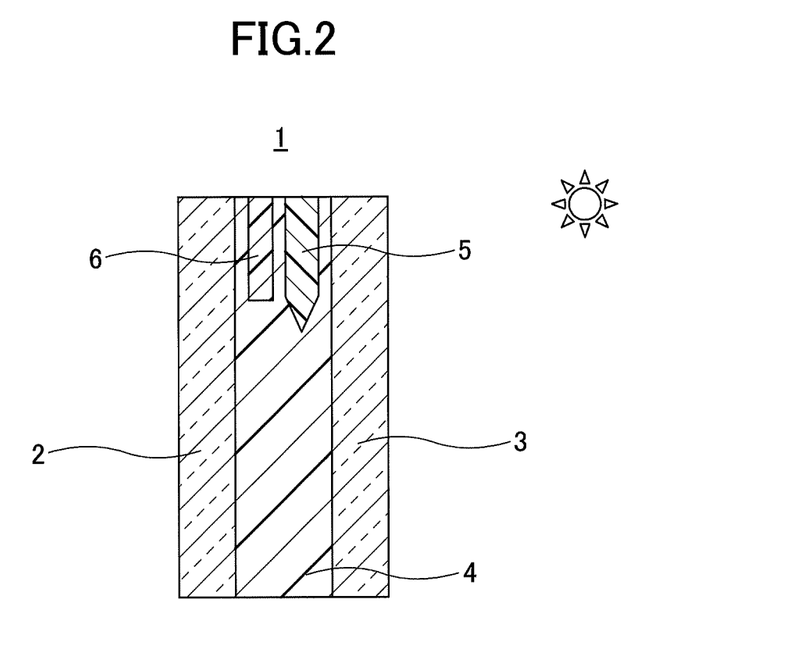
FIG. 2 is a cross-sectional view illustrating an example of a portion near an end portion of an upper side of the vehicular laminated glass 1 according to the embodiment of the present invention.

FIG. 2 is a cross-sectional view illustrating a portion near an end portion of an upper side of the vehicular laminated glass 1 according to the present invention. A first glass plate 2, a second glass plate 3, an intermediate film 4, a colored layer 5, and a light scattering layer 6 are stacked. The light scattering layer 6 is arranged at a vehicle-inner side relative to the colored layer 5. In the present embodiment, the first glass plate 2 is assumed to be arranged at a vehicle-inner side, and the second glass plate 3 is assumed to be disposed at a vehicle-outer side.

In the present invention, a visible light transmittance of the laminated glass means a ratio of visible light transmitted through the first glass plate 2 with respect to incident light incident to the second glass plate 3 along a normal direction of the surface of the second glass plate 3 (i.e., an incidence angle of 0 degrees). More specifically, the visible light transmittance can be measured according to a measurement method of spectral transmittance described in JIS R 3106: 1998 (Testing method on transmittance, reflectance and emittance of flat glasses and evaluation of solar heat gain coefficient). The visible light reflectance of the laminated glass means a ratio of specularly reflected light of incident light incident to the first glass plate 2 at an incidence angle of less than 15 degrees with respect to reflected light of a standard white plate, i.e., a reflection reference. That is, the visible light reflectance is measured by the measurement method of the spectral reflectance described in JIS R 3106: 1998. The vehicle-inner side visible light diffuse reflectance of the laminated glass means a ratio of all the reflected light except specularly reflected light of incident light incident to the first glass plate 2 at an incidence angle of less than 15 degrees with respect to reflected light of a standard white plate, i.e., a reflection reference. The vehicle-outer side visible light diffuse reflectance of the laminated glass means a ratio of all the reflected light except specularly reflected light of incident light incident to the second glass plate 3 at an incidence angle of less than 15 degrees with respect to reflected light of a standard white plate, i.e., a reflection reference. In the present invention, the visible light refers to light having a wavelength of 380 nm to 780 nm.

[Laminated Glass]

In the region A7 having the colored layer 5 and the light scattering layer 6, the laminated glass 1 has a visible light transmittance of 0.7% to 32%, a visible light reflectance of 0.5% to 10%, and a vehicle-inner side visible light diffuse reflectance of 3% to 45%. In the region A7, the laminated glass 1 is configured such that the light scattering layer 6 is located at the vehicle-inner side relative to the colored layer 5. The laminated glass 1 having such optical characteristics and configuration has image visibility and anti-glare properties, and is excellent in design during non-projection, and alleviates noise light emitted to the outside of the vehicle.

As a result of studying combinations of transparent screens and shade bands for automotive windshields, the inventors of the present invention have found a problem in that, although it is possible to achieve both visibility and anti-glare properties, light from the headlights of a vehicle behind is reflected by the transparent screen and is likely to be become noise light emitted to the outside of the vehicle. In addition, the inventors of the present invention have found that, during non-projection, the transparent screen is noticeable from the vehicle-inner side. Accordingly, in a case where the visible light diffuse reflectance of the transparent screen was lowered, the diffuse reflection light quantity decreased and the noise light emitted to the outside of the vehicle was reduced. In addition, during non-projection, the whiteness of the transparent screen was reduced, and the transparent screen became less noticeable. However, the luminance of the image projected onto the transparent screen decreased, and the image visibility decreased. In other words, the inventors of the present invention have found that, in the transparent screen provided in the shade band of the laminated glass, it is desired to achieve all of being excellent in image visibility, being excellent in design during non-projection, and alleviating noise light emitted to the outside of the vehicle.

The inventors of the present invention have studied the above problems as follows, and completed the present invention.

First, the inventors of the present invention noted that the reason why the reflected light of the light emitted by the headlights of a vehicle behind is likely to cause noise light emitted to the outside of the vehicle is because the diffuse reflectance of the light scattering layer is high. Therefore, as described above, the inventors of the present invention have lowered the vehicle-inner side visible light diffuse reflectance of the light scattering layer, and as a result, the diffuse reflection light quantity decreased, and the noise light emitted to the outside of the vehicle was alleviated. Furthermore, the whiteness of the light scattering layer during non-projection was alleviated, and the light scattering layer became less noticeable. However, due to the decrease in the luminance of the image projected onto the light scattering layer, the image visibility decreased.

Next, the inventors of the present invention noted that the problem of the reduction in the luminance of the image projected onto the light scattering layer can be solved by setting the vehicle-inner side diffuse reflectance of the laminated glass to be higher than the vehicle-outer side diffuse reflectance. When the light scattering layer was positioned closer to the vehicle-inner side relative to the colored layer, the luminance of the image projected onto the light scattering layer could be increased without changing the structure of the light scattering layer, and the image visibility was improved.

Furthermore, the inventors of the present invention noted that one of the causes of the problem of the light scattering layer standing out during non-projection was that the light scattering layer was low in the amount of transmitted light from the outside of the vehicle. The inventors of the present invention have found that, when the visible light transmittance of the light scattering layer was increased, the light scattering layer became less noticeable, and was excellent in design during non-projection.

As described above, the vehicular laminated glass excellent in image visibility and design during non-projection and alleviating the noise light emitted to the outside of the vehicle could be obtained by controlling the vehicle-inner side visible light diffuse reflectance and the visible light transmittance of the light scattering layer and arranging the light scattering layer at a vehicle-inner side relative to the colored layer.

The laminated glass 1 has a vehicle-inner side visible light diffuse reflectance of 3% to 45% in the region A7. When the vehicle-inner side visible light diffuse reflectance is 3% or more, the luminance of the projection image improves, which is excellent in image visibility. When the vehicle-inner side visible light diffuse reflectance is 45% or less, the noise light emitted to the outside of the vehicle can be alleviated. The vehicle-inner side visible light diffuse reflectance is preferably 4% to 40%, more preferably 10% to 40%, and still more preferably 20% to 30%.

In the region A7, the laminated glass 1 has the light scattering layer 6 located at the vehicle-inner side relative to the colored layer 5. When the laminated glass 1 has such a configuration, the vehicle-inner side visible light diffuse reflectance can become higher than the vehicle-outer side visible light diffuse reflectance. Accordingly, the luminance of the projection image can be increased and the image visibility improves. The vehicle-outer side visible light diffuse reflectance is preferably 30% or less. When the vehicle-outer side visible light diffuse reflectance is 30% or less, the vehicle-inner side visible light diffuse reflectance can become higher than the vehicle-outer side diffuse reflectance.

In the region A7, the laminated glass 1 has a visible light transmittance of 0.7% to 32%. When the visible light transmittance is 0.7% or more, the light scattering layer 6 during non-projection can become less noticeable. When the visible light transmittance is 32% or less, anti-glare property and heat shielding property are improved. The visible light transmittance is preferably 1% to 20%, and more preferably 1% to 10%.

In the laminated glass 1, various sensors can be installed on the surface of the glass plate in the region A7. In a case where various sensors are installed in the region A on the surface of the glass plate, it is preferable that the transmittance of the light having a wavelength detected by the various sensors is 5% or more.

In the region A7, the laminated glass 1 has a visible light reflectance of 0.5% to 10%. When the visible light reflectance is 0.5% or more, the vehicle-inner side visible light diffuse reflectance can easily be 3% or more, which is excellent in image visibility. When the visible light reflectance is 10% or less, the noise light emitted to the outside of the vehicle can be alleviated. Further, the decrease in the visible light reflectance has an effect of increasing the visible light transmittance, and therefore, the light scattering layer 6 during non-projection can be less noticeable. The visible light reflectance is preferably 0.5% to 8%, more preferably 0.5% to 6%, and still more preferably 0.5% to 5%.

In the laminated glass 1, the visible light transmittance in the region B8 having the colored layer 5 but not having the light scattering layer 6 is preferably 3% to 40%. In a case where metal or semiconductor is used in a part of or the entirety of a reflection layer 13, a visible light transmittance of 3% or more results in excellent radio wave transmittance, and a visible light transmittance of 40% or less results in anti-glare property and heat shielding property.

Regarding the color of the laminated glass 1, in the region B8, a value of an index a* expressed in CIE (International Commission on Illumination) L*a*b* color space is preferably in a range of −55 to −5, and a value b* is preferably in a range of −30 to −3, and a value of a chroma C* (hereinafter denoted as a value C*) represented by the following Expression (1) is preferably in a range of 20 to 60.

[Expression 1]

$$C^* = \sqrt{(a^*)^2 + (b^*)^2} \quad (1)$$

When the value C* is 20 or more, the design as laminated glass is excellent. When the value C* is 60 or less, the difference between the value C* in the projection image and the value C* in the background becomes large, so that the projection image is likely to stand out and, the image visibility is excellent. In the laminated glass 1, the value a* is more preferably in a range of −30 to −5, the value b* is more preferably in a range of −20 to −3, and the value C* is more preferably in a range of 20 to 30.

In the region A7 of the laminated glass 1, a value a* represented by L*a*b* color space is a range of −55 to −5, a value b* is in a range of −30 to −5, and a value C* expressed by Expression (1) is in a range of 15 to 60.

The difference between the value C* in the region A7 and the value C* in the region B8 is preferably 10 or less. When the difference in the value C* is 10 or less, the light scattering layer 6 during non-projection does not stand out because the chromas in the background are almost the same. The difference between the value C* in the region A and the value C* in the region B is particularly preferably 5 or less.

In the region A7, the laminated glass 1 preferably includes two or more light scattering layers 6 overlapping as seen from a direction perpendicular to the principal surface. Since the laminated glass 1 includes the light scattering layers 6 that overlap each other, the luminance of the projection image increases, so that the laminated glass 1 is less likely to be affected by external light and has excellent image visibility.

The laminated glass 1 preferably includes a functional film or a functional coating. Examples of the functional films include an ultraviolet cut film, an infrared cut film, and an anti-reflection film. Examples of the functional coating include an ultraviolet cut coating, an infrared cut coating, or an anti-reflection coating. An example of the infrared cut coating includes a multi-layer coating having a structure in which a layer composed mainly of silver is sandwiched between dielectric layers. An example of the UV-cut coating includes silica coating containing UV absorbers. Examples of the anti-reflection coatings include a fluoride coating, a silica coating including hollow particles, and a multi-layer coating in which a high refractive index layer and a low refractive index layer are stacked. In particular, since the laminated glass 1 includes an anti-reflection coating or an anti-reflection film, the laminated glass 1 has a lower visible light reflectance, a higher visible light transmittance, and a higher vehicle-inner side visible light diffuse reflectance, so that the laminated glass 1 is excellent in image visibility, anti-glare property, and design during non-projection. In that respect, the anti-reflection coating or the anti-reflection film is preferably provided on the vehicle-inner side principal surface of the first glass plate 2 arranged at the vehicle-innermost side in the laminated glass 1.

The region A7 preferably occupies an area of 40% to 95% of the first region 9. When the region A7 occupies more than 40% of the area of the first region 9, the projected image becomes larger, which increases the image visibility of the laminated glass 1. When the area A7 is 95% or less of the first region 9, the laminated glass 1 can have a sufficient degree of radio wave transmittance when the reflection layer 13 includes a metal or a semiconductor.

The region A7 is preferably in a substantially rectangular shape having a short side and a long side. The length of the short side of the substantially rectangular shape is preferably 100 mm to 150 mm. When the length of the short side of the substantially rectangular shape is within this range, the image visibility of the laminated glass 1 is high because the projection image is sufficiently large.

In the first region 9, the laminated glass 1 preferably includes a region in which a visible light transmittance changes depending on the location, i.e., a so-called gradation region. The region in which the visible light transmittance changes can be controlled by changing the film thickness of the colored layer. The region in which the visible light transmittance changes is preferably a region below the first region 9. The width of the region in which the visible light transmittance changes is preferably 5 mm to 20 mm. When the width of the region in which the visible light transmittance changes is within this range, the laminated glass 1 is excellent in design.

The laminated glass 1 preferably does not have the light scattering layer 6 in the region in which the visible light transmittance of the first region 9 changes. The laminated glass 1 having such a configuration is excellent in image visibility because, on the entire region A7, the vehicle-inner side visible light diffuse reflectance can be controlled to be within a predetermined range.

[Intermediate Film]

The laminated glass 1 includes an intermediate film 4, a colored layer 5, and a light scattering layer 6.

The intermediate film 4 preferably has a visible light transmittance of 85% to 100% excluding the reflection on the surface. When the visible light transmittance of the intermediate film 4 is within this range, the visible light transmittance of the laminated glass can be 70% to 99% in the second region 10.

The intermediate film 4 preferably has a visible light reflectance of 2% to 8% in a case where the intermediate film 4 has an interface with air. When the visible light reflectance of intermediate film 4 is within this range, the visible light reflectance of the laminated glass can be 6% to 8% in the second region 10.

The materials constituting the intermediate film 4 are not particularly limited as long as the visible light transmittance of the laminated glass is 70% to 99%, and is preferably a polyvinyl acetal resin, more preferably, a polyvinyl butyral resin. The intermediate film 4 preferably includes a plasticizer.

The intermediate film 4 is preferably formed by alternately stacking a skin layer and a core layer. The core layer preferably includes one or more layers and the skin layer preferably includes two or more layers. The elastic modulus of the core layer is preferably smaller than that of the skin layer. By configuring the intermediate film 4 in this way, the impact resistance and the sound insulation of the laminated glass 1 are enhanced.

The film thickness of the intermediate film 4 is preferably in a range of 0.3 mm to 6.0 mm, more preferably 0.5 mm to 2.0 mm. The film thickness of the core layer is preferably 0.1 mm to 2.0 mm, and more preferably 0.1 mm to 0.6 mm. The film thickness of the skin layer is preferably 0.1 mm to 2.0 mm, and more preferably 0.1 mm to 1.0 mm.

[Colored Layer]

The colored layer 5 is preferably formed by including a dye in a part of the intermediate film 4. Examples of the dye include azo and phthalocyanine dyes. The colored layer 5 preferably includes an infrared shielding component. In the colored layer 5, it is preferable to disperse and blend infrared shielding fine particles as an infrared shielding component. Examples of the infrared shielding fine particles include ATO (antimony-doped tin oxide) fine particles and ITO (indium tin oxide) fine particles.

In the first region 9, the colored layer 5 preferably has a shape in which the film thickness gradually decreases toward the lower side of the laminated glass 1. When the colored layer 5 has such a shape in which the film thickness gradually decreases, the laminated glass 1 has a region where the visible light transmittance changes depending on the location in the first region 9.

In the intermediate film 4 including the colored layer 5, the visible light transmittance is preferably 3% to 50%. When the visible light transmittance is within this range, the visible light transmittance can be 3% to 40% in the region B8 of the laminated glass 1.

In the intermediate film 4 including the colored layer 5, the visible light reflectance is more preferably 2% to 8%. When the visible light reflectance is within this range, the visible light reflectance can be 3% to 6% in the region B8 of the laminated glass 1.

In the intermediate film 4 including the colored layer 5, a value of an index $a^*$ expressed in CIE $L^*a^*b^*$ color space is preferably in a range of $-55$ to $-10$, a value $b^*$ is preferably in a range of $-20$ to $0$, a value $C^*$ expressed by the above expression (1) is preferably in a range of 20 to 55. When the value $C^*$ is 20 or more, the design as laminated glass is excellent. When the value $C^*$ is 55 or less, the projection image is likely to stand out against the background, and the image visibility becomes excellent. The value $a^*$ is particularly preferably in a range of $-15$ to $-10$, the value $b^*$ is particularly preferably in a range of $-20$ to $-15$, and the value $C^*$ is particularly preferably in a range of 20 to 30.

[Light Scattering Layer]

Figure 3:
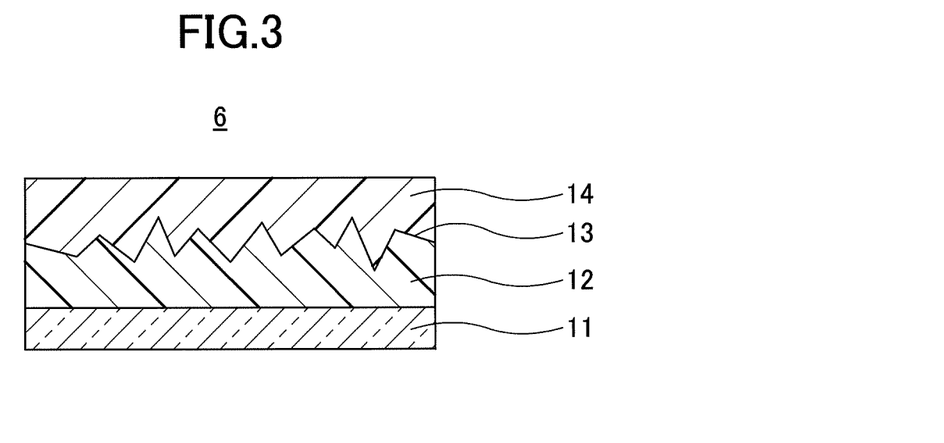
FIG. 3 is a cross sectional view of a light scattering layer 6 in the vehicular laminated glass according to the embodiment of the present invention.

FIG. 3 is a cross sectional view illustrating an example of the light scattering layer 6 in the vehicular laminated glass 1 according to the embodiment of the present invention.

The light scattering layer 6 is preferably composed of a transparent substrate 11 and a first transparent layer 12 having an uneven structure on the surface. Alternatively, the light scattering layer 6 preferably has a structure including a transparent substrate 11, a first transparent layer 12 having an uneven structure on the surface, a reflection layer 13 formed on the first transparent layer 12, and a second transparent layer 14 formed on the reflection layer 13. When the light scattering layer 6 includes any one of the above-described configurations, the laminated glass 1 can have a vehicle-inner side visible light diffuse reflectance of 3% to 45% in the region A7.

The surface of the first transparent layer 12 preferably has an arithmetic mean height Sa of 0.1 μm to 20 μm, more preferably 0.1 μm to 10 μm, and still more preferably has an arithmetic mean height Sa of 0.2 μm to 5 μm for structures having an average period of 20 μm or less. A maximum height Sz is preferably 50 μm or less, more preferably 20 μm or less, and still more preferably 10 μm or less. A core height Sk of a core part is preferably 0.1 μm to 20 μm, more preferably 10 μm or less. An areal material ratio [Smr2−Smr1] of the core part is preferably 70% or more. The arithmetic mean height Sa, the maximum height Sz, the core height Sk of the core part, and the areal material ratio [Smr2−Smr1] of the core part are measured and calculated by the measurement method described in ISO 25178-1: 2016. The core part refers to all of the height regions except for reduced peaks and reduced valleys. Smr1 denotes an areal material ratio at an intersection between the height of an upper part of the core part and an areal material ratio curve of a surface. Smr2 denotes an areal material ratio at an intersection between the height of a lower part of the core part and the areal material ratio curve of the surface. When the arithmetic mean height Sa is 0.1 μm or more, the vehicle-inner side visible light diffuse reflectance of the laminated glass 1 increases, and the luminance of the projection image increases, resulting in excellent image visibility. When the arithmetic mean height Sa is 20 μm or less, the vehicle-inner side visible light diffuse reflectance of the laminated glass 1 decreases, so that the light scattering layer 6 during non-projection can become less noticeable. When the maximum height Sz is 50 μm or less, emergence of graininess can be reduced in the projection image displayed on the laminated glass 1 by reflection, and the image visibility can be enhanced. When the core height Sk is 0.1

μm or more, the vehicle-inner side visible light diffuse reflectance of the laminated glass 1 increases, and the luminance of the projection image increases, resulting in excellent image visibility. When the core height Sk is 20 μm or less, the visible light diffuse transmittance of the laminated glass 1 decreases, and the image visibility becomes excellent. When the areal material ratio [Smr2-Smr1] of the core parts is 70% or more, the vehicle-inner side visible light diffuse reflectance of the laminated glass 1 becomes uniform within the plane, so the luminance of the projection image becomes uniform, and the image visibility is excellent.

The material constituting the transparent substrate 11 is preferably glass or transparent resin. The transparent substrate 11 is preferably not birefringent. Examples of the transparent resins include polyethylene terephthalate resin, polyethylene naphthalate resin, and polycarbonate resin. The thickness of the transparent substrate 11 is preferably in a range of 0.01 mm to 5 mm.

The material constituting the first transparent layer 12 and the second transparent layer 14 is preferably a transparent resin or a transparent metal oxide. Examples of transparent resins include acrylic resin, epoxy resin, and polycarbonate resin. An example of transparent metal oxide includes porous silica. The visible light transmittance of the first transparent layer 12 and the second transparent layer 14 is preferably 50% or more. The thickness of the first transparent layer 12 and the second transparent layer 14 is preferably 0.1 μm to 50 μm, and more preferably 1 μm to 30 μm.

The material constituting the reflection layer 13 is preferably one of metal, metal oxide, and metal nitride. The thickness of the reflection layer 13 is preferably 1 nm to 200 nm, more preferably 5 nm to 100 nm, and still more preferably 1 nm to 100 nm.

The light scattering layer 6 preferably has a surface resistivity of 1 Ω/sq to $1\times10^6$ Ω/sq. When the surface resistivity of the light scattering layer 6 is within this range, the radio wave transmittance of the laminated glass 1 can be increased. In order to set the surface resistivity of the light scattering layer 6 within this range, it is preferable to provide a metal fine particle coating as the reflection layer 13 on a part of the surface of the first transparent layer 12. The degree of flexibility in designing the surface resistivity of the light scattering layer 6 can be increased by controlling the space between metal particles.

The light scattering layer 6 is more preferably configured not to include any conductive component. When the light scattering layer 6 is configured not to include any conductive component, the radio wave transmission of the laminated glass 1 can be furthermore improved. The light scattering layer 6 is composed of the transparent substrate 11 and the first transparent layer 12, and the first transparent layer 12 is preferably composed of a transparent resin or a transparent metal oxide.

In the light scattering layer 6, the half gain angle at which the luminance is halved is preferably 10 degrees to 30 degrees. When the half gain angle is within this range, the occupant can view the projection image efficiently.

The intermediate film 4 including the colored layer 5 and the light scattering layer 6 preferably includes a visible light transmittance of 0.5% to 40% in the region including the colored layer 5 and the light scattering layer 6. When the visible light transmittance is within this range, the laminated glass 1 can have a visible light transmittance of 0.7% to 32% in the region A7.

In the region including the colored layer 5 and the light scattering layer 6, the intermediate film 4 including the colored layer 5 and the light scattering layer 6 preferably has a visible light reflectance of 0.5% to 12%. When the visible light reflectance is within this range, the laminated glass 1 can have a visible light reflectance of 0.5% to 10% in the region A7.

In the region including the colored layer 5 and the light scattering layer 6, the intermediate film 4 including the colored layer 5 and the light scattering layer 6 preferably has a vehicle-inner side visible light diffuse reflectance of 4% to 50%. When the visible light reflectance is within this range, the laminated glass 1 can have a vehicle-inner side visible light diffuse reflectance of 3% to 45% in the region A7.

In the region including the colored layer 5 and the light scattering layer 6, the intermediate film 4 including the colored layer 5 and the light scattering layer 6 has a value of an index a* expressed in CIE L*a*b* color space in a range of −60 to 5, a value b* in a range of −35 to 5, and a value C* expressed by the above expression (1) in a range of 10 to 70. When the value C* is 10 or more, the design as laminated glass is excellent. When the value C* is 70 or less, the projection image is likely to stand out against the background, and the image visibility of the laminated glass 1 is excellent. The value a* is more preferably in a range of −5 to −55, the value b* is more preferably in a range of −30 to 0, and the value C* is more preferably in a range of 15 to 60.

[Glass Plate]

Examples of the glass plate used for the laminated glass 1 include soda lime glass, aluminosilicate glass, borosilicate glass, alkali-free glass, and quartz glass. The glass plate is preferably reinforced physically or chemically. Multiple glass plates may be the same or different from each other. The glass plate 1 and the glass plate 2 preferably include a component that functions as an infrared absorber or an ultraviolet absorber in the composition. The glass plate 1 and the glass plate 2 are preferably green colored glass or ultraviolet shielding colored glass.

[Producing Method]

The laminated glass 1 can be produced by a known method.

A laminated glass precursor is prepared in which the intermediate film 4 including the colored layer 5 and the light scattering layer 6 is inserted between a plurality of glass plates. This laminated glass precursor is placed in a rubber vacuum bag, and the laminated glass precursor is bonded at a temperature of about 70 to 110 degrees Celsius while the vacuum bag is evacuated (degassed) to attain a decompressed pressure (absolute pressure) of about −65 to −100 kPa in the vacuum bag. Further, pressure bonding is performed by heating and pressurizing the laminated glass precursor under the conditions of a temperature of 100 degrees Celsius to 140 degrees Celsius and a pressure of 0.6 MPa to 1.3 MPa. As a result, highly durable laminated glass can be obtained.

[Purpose]

The laminated glass 1 can be used as vehicular laminated glass, especially automotive laminated glass.

EXAMPLES

The present invention will be explained in detail with reference to the following examples. The present invention is not limited to the embodiments and examples described below.

Example 1

Figure 4:
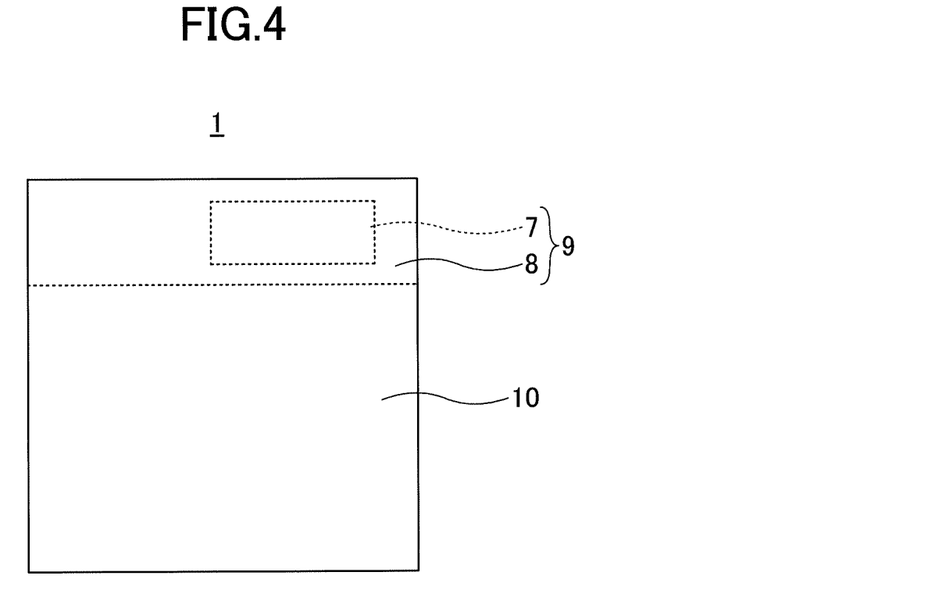
FIG. 4 is a front view illustrating an example of a configuration of the vehicular laminated glass 1 for explaining examples and comparative examples of the present invention.
Figure 5:
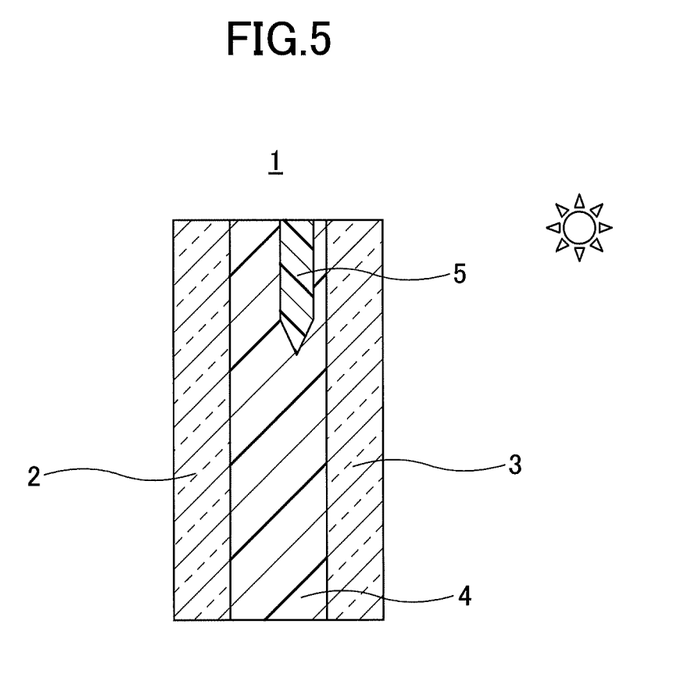
FIG. 5 is a cross-sectional view illustrating another example of a portion near an end portion of an upper side of the vehicular laminated glass 1 according to the embodiment of the present invention.

A glass plate A (Green Soda Lime Glass, produced by AGC Inc.) having a size of 300 mm×300 mm, an intermediate film A having the colored layer 5 (S-LEC in light blue, film thickness of 0.76 mm, produced by Sekisui Chemical Co., Ltd.), and a light scattering layer A were attached together as illustrated in the front view of FIG. 4 and pressure bonding was performed. As a result, the laminated glass 1 was obtained. The configuration of the laminated glass in Example 1 is shown in Table 1 and Table 2. In the region A7, the laminated glass 1 has a cross-sectional configuration illustrated in FIG. 2, and in the region B8, the laminated glass 1 has a cross-sectional configuration illustrated in FIG. 5.

The light scattering layer A was made according to the following procedure. That is, first, an acrylic resin A (OGSOL EA-F5003, produced by Osaka Gas Chemical Co., Ltd.) was applied on a PET film (film thickness of 0.1 mm). Next, a mold having an uneven structure formed on the surface was pressed against the surface of the acrylic resin A and cured by UV light irradiation. As a result, the first transparent layer 12 having an uneven structure formed on the surface was produced. Next, an Al layer having a film thickness of 10 nm was formed as the reflection layer 13 on the surface of the first transparent layer 12 by vacuum deposition. Next, the acrylic resin A was applied to the surface of the reflection layer 13 and cured by UV light irradiation to form the second transparent layer 14. As a result, the light scattering layer A was produced.

The arithmetic mean height Sa of the first transparent layer 12 was measured using a laser microscope (OLS4100, produced by Olympus Corporation). The surface resistivity of the light scattering layer 6 was measured using a non-contact conductivity meter (produced by Delcom Instruments, Inc.). Table 1 shows measurement results.

Examples 2 to 6 and Comparative Examples 1 to 3

Laminated glass 1 according to Examples 2 to 6 and Comparative Examples 1 to 3 were prepared by performing the attaching process and the pressure bonding process according to the same procedure as Example 1. For each of Examples and Comparative Examples, the configuration of the laminated glass 1 is shown in Table 1, and the configuration of the light scattering layer 6 is shown in Table 2.

In Table 1, a glass plate B was white soda lime glass (produced by AGC Inc.), and a glass plate C was green colored soda lime glass with a magnesium fluoride coating. The magnesium fluoride coating was formed on the vehicle-inner side principal surface of the first glass plate. An intermediate film B was S-LEC in light green (produced by Sekisui Chemical Co., Ltd.), and the film thickness was 0.76 mm.

TABLE 1

| | | | | | | Laminated glass | | | |
|---|---|---|---|---|---|---|---|---|---|
| | First glass plate | Plate thickness of first glass plate [mm] | Intermediate film having colored layer | Light scattering layer | Position of light scattering layer | Surface resistivity of light scattering layer [Ω/sq] | Sa of first transparent layer [μm] | Second glass plate | Plate thickness of second glass plate [mm] |
| Example 1 | Glass plate A | 2.0 | Intermediate film A | Light scattering layer A | At vehicle-inner side relative to colored layer | 10 | 0.2 | Glass plate A | 2.0 |
| Example 2 | Glass plate A | 2.0 | Intermediate film B | Light scattering layer A | At vehicle-inner side relative to colored layer | 10 | 0.2 | Glass plate A | 2.0 |
| Example 3 | Glass plate B | 2.0 | Intermediate film B | Light scattering layer C | At vehicle-inner side relative to colored layer | $1 \times 10^{13}$ | 0.2 | Glass plate A | 2.0 |
| Example 4 | Glass plate A | 2.0 | Intermediate film A | Light scattering layer B | At vehicle-inner side relative to colored layer | 5 | 0.2 | Glass plate A | 2.0 |
| Example 5 | Glass plate A | 2.0 | Intermediate film A | Light scattering layer A + light scattering layer A | At vehicle-inner side relative to colored layer | 5 | 0.2 | Glass plate A | 2.0 |
| Example 6 | Glass plate C | 2.0 | Intermediate film A | Light scattering layer A | At vehicle-inner side relative to colored layer | 10 | 0.2 | Glass plate C | 2.0 |
| Comparative example 1 | Glass plate A | 2.0 | Intermediate film A | Light scattering layer D | At vehicle-inner side relative to colored layer | 4 | 0.2 | Glass plate A | 2.0 |
| Comparative example 2 | Glass plate A | 2.0 | Intermediate film A | Light scattering layer E | At vehicle-inner side relative to colored layer | 1 | 0.2 | Glass plate A | 2.0 |
| Comparative example 3 | Glass plate A | 2.0 | Intermediate film A | Light scattering layer A | At vehicle-outer side relative to colored layer | 10 | 0.2 | Glass plate A | 2.0 |

TABLE 2

|  | Transparent substrate | First transparent layer | Reflection layer Material | Reflection layer Film thickness [nm] | Second transparent layer |
|---|---|---|---|---|---|
| Light scattering layer A | PET film | Acrylic resin A | Al | 10 | Acrylic resin A |
| Light scattering layer B | PET film | Acrylic resin A | Ag | 12 | Acrylic resin A |
| Light scattering layer C | PET film | Porous silica | — | — | — |
| Light scattering layer D | PET film | Acrylic resin A | Al | 30 | Acrylic resin A |
| Light scattering layer E | PET film | Acrylic resin A | Ag | 18 | Acrylic resin A |

[Visible Light Transmittance, Visible Light Reflectance, and Vehicle-Inner Side Visible Light Diffuse Reflectance]

For the laminated glass 1, a visible light transmittance, a visible light reflectance, and a vehicle-inner side visible light diffuse reflectance for light having a wavelength of 380 nm to 780 nm were measured using a UV, visible, near-infrared light spectrophotometer (Solid Spec-3700, produced by Shimadzu Corporation). Table 3 shows measurement results. The visible light transmittance is a ratio of total transmitted light that is transmitted to a side of the first glass plate 2 arranged at the vehicle-inner side with respect to the incident light incident to at an incidence angle 0 degrees from a side of the second glass plate 3 arranged at the vehicle-outer side of the laminated glass 1. The visible light reflectance is a ratio of specularly reflected light of incident light incident to at an incidence angle of 15 degrees from a side of the first glass plate 2 with respect to reflected light reflected by a standard white plate. The vehicle-inner side visible light diffuse reflectance is a ratio of all the reflected light except the specularly reflected light of incident light incident to at an incidence angle of 15 degrees from the side of the first glass plate 2 with respect to reflected light reflected by the standard white plate.

[Color Space Indices a*, b*, C*]

For the laminated glass 1, the indices a* and b* were measured using a spectrocolorimeter (CM-3700A, produced by Konica Minolta, Inc.), and the value C* was calculated using the above expression (1). Table 3 shows measurement results.

TABLE 3

| | First region | | | | | | | | | | | | | |
|---|---|---|---|---|---|---|---|---|---|---|---|---|---|---|
| | Region A | | | | | | Region B | | | | | | Difference in C* between region A and region B | Width of region in which visible light transmittance changes [mm] |
| | Visible light transmittance | Visible light reflectance | Vehicle-inner side visible light diffuse reflectance | a* | b* | C* | Length of short side of region A [mm] | Visible light transmittance | Visible light reflectance | Vehicle-inner side visible light diffuse reflectance | a* | b* | C* | | |
| Example 1 | 1.4 | 5.1 | 20.9 | −16.6 | −12.1 | 21 | 55 | 3.7 | 4.4 | 4.7 | −22.0 | −13.4 | 26 | 5 | 15 |
| Example 2 | 6.4 | 5.5 | 20.9 | −32.0 | −10.0 | 34 | 55 | 16.8 | 5.5 | 4.7 | −52.0 | −4.0 | 52 | 19 | 15 |
| Example 3 | 31.0 | 5.8 | 4.6 | −52.6 | −18.0 | 56 | 55 | 32.0 | 5.5 | 4.7 | −52.1 | −17.5 | 55 | 1 | 15 |
| Example 4 | 1.1 | 4.9 | 43.0 | −10.0 | −28.0 | 30 | 55 | 3.7 | 4.4 | 4.7 | −22.0 | −13.4 | 26 | 4 | 15 |
| Example 5 | 0.7 | 4.9 | 27.0 | −13.0 | −11.0 | 17 | 55 | 3.7 | 4.4 | 4.7 | −22.0 | −13.4 | 26 | 9 | 15 |
| Example 6 | 1.5 | 0.7 | 21.9 | −16.6 | −12.1 | 21 | 55 | 3.7 | 4.4 | 4.7 | −22.0 | −13.4 | 26 | 5 | 15 |
| Comparative example 1 | 0.1 | 5 | 40 | −12 | −10 | 16 | 55 | 3.7 | 4.4 | 4.7 | −22.0 | −13.4 | 26 | 10 | 15 |
| Comparative example 2 | 0.5 | 5 | 60 | −8 | −9 | 12 | 55 | 3.7 | 4.4 | 4.7 | −22.0 | −13.4 | 26 | 14 | 15 |
| Comparative example 3 | 1.4 | 4.6 | 1.7 | −16.6 | −12.1 | 21 | 55 | 3.7 | 4.4 | 4.7 | −22.0 | −13.4 | 26 | 5 | 15 |

[Image Visibility]

The laminated glass 1 prepared according to the above procedure was installed in a part of a windshield of a test vehicle. An image was projected onto the laminated glass 1, and the reflection image was visually observed from the inside of the test vehicle to evaluate the visibility. When the reflected image can be clearly recognized even if the surroundings are bright, the evaluation result was determined to be excellent. When the reflected image can be clearly recognized only when the surroundings are dark, the evaluation result was determined to be good. When the reflected image can be roughly recognized even when the surroundings are dark, the evaluation result was determined to be fair. When the reflected image cannot be recognized even when the surroundings are dark, the evaluation result was determined to be poor. Table 4 shows evaluation results.

[Anti-Glare Property]

The produced laminated glass 1 was installed in a part of a windshield of a test vehicle. The sun at sunset was observed through the laminated glass 1, and the degree of dazzle was evaluated according to the following criteria. When the dazzle does not bother the observer at all, the evaluation result was determined to be excellent. When the dazzle was acceptable, the evaluation result was determined to be good. When the dazzle was to such a degree that a disturbance was caused, the evaluation result was determined to be poor. Table 4 shows evaluation results.

[Noise Light Emitted to Outside of Vehicle]

The produced laminated glass 1 was installed in a part of a windshield of a test vehicle. Another vehicle was prepared behind the test vehicle, the headlights of the vehicle behind the test vehicle were turned on, and the appearance of the laminated glass 1 was visually evaluated from the outside of the test vehicle. When the reflected light of the headlights was not found, the evaluation result was determined to be fair, and when found, the evaluation result was determined to be poor. Table 4 shows the evaluation results.

[Appearance During Non-Projection]

The produced laminated glass 1 was installed in a part of a windshield of a test vehicle. The appearance of the laminated glass 1 was evaluated visually from the inside of the vehicle. When presence of the light scattering layer was not recognized, the evaluation result was determined to be excellent. When presence of the light scattering layer was recognized but does not bother the observer, the evaluation result was determined to be good. When presence of the light scattering layer bothers the observer, the evaluation result was determined to be poor. Table 4 shows the evaluation results.

TABLE 4

| | Image visibility | Antiglare property | Noise light emitted to outside | Appearance during non-projection |
|---|---|---|---|---|
| Example 1 | Good | Good | Good | Good |
| Example 2 | Good | Good | Good | Good |
| Example 3 | Fair | Good | Good | Good |
| Example 4 | Excellent | Good | Good | Good |
| Example 5 | Excellent | Good | Good | Good |
| Example 6 | Excellent | Excellent | Good | Excellent |
| Comparative example 1 | Good | Good | Good | Poor |
| Comparative example 2 | Good | Good | Poor | Poor |
| Comparative example 3 | Poor | Good | Good | Good |

As illustrated in Examples 1 to 6 of Table 4, the laminated glass 1, which has a visible light transmittance of 0.7% to 32%, a visible light reflectance of 0.5% to 10%, and a vehicle-inner side visible light diffuse reflectance of 3% to 45% in the region A7, alleviated the noise light emitted to the outside of the vehicle and was excellent in appearance during non-projection while maintaining a high image visibility and anti-glare property. In particular, the laminated glass 1 described in Example 6 having an anti-reflection layer was particularly excellent in image visibility, anti-glare property, and appearance during non-projection.

In the region A7, the laminated glass described in Comparative Example 1 of which the visible light transmittance was less than 0.7% had a problem in that the appearance during non-projection was poor. Further, in the region A7, the laminated glass described in Comparative Example 2 of which the vehicle-inner side visible light diffuse reflectance was more than 45% had a problem in that much noise light was emitted to the outside of the vehicle. The laminated glass described in Comparative Example 3 in which the light scattering layer 6 was arranged at a vehicle-outer side with respect to the colored layer 5 had a problem in that the image visibility was low.

Therefore, the vehicular laminated glass 1 according to the Examples of the present invention has proved to be excellent in image visibility, anti-glare property, and design during non-projection, and alleviates the noise light emitted to the outside of the vehicle.

The present invention has been described above with reference to the embodiments, but the present invention is not limited to the above embodiments. Various modifications that can be understood by those skilled in the art can be applied to the configuration and details of the present invention within the scope of the present invention.

INDUSTRIAL APPLICABILITY

The vehicular laminated glass according to the present invention is excellent in image visibility, anti-glare property, and design during non-projection, and alleviates the noise light emitted to the outside of the vehicle, and is therefore applied to vehicles such as automobiles, trains, and the like, and in particular, preferably applied to automobiles.

This international patent application claims priority based on Japanese patent application No. 2017-144514 filed on Jul. 26, 2017, the entire content of which is incorporated herein by reference.

REFERENCE SIGNS LIST

1 Laminated Glass
2 First Glass Plate
3 Second Glass Plate
4 Intermediate Film
5 Colored Layer
6 Light Scattering Layer
7 Region A
8 Region B
9 First Region
10 Second Region
11 Transparent Substrate
12 First Transparent Layer
13 Reflection Layer
14 Second Transparent Layer

What is claimed is:

1. A vehicular laminated glass in which a plurality of glass plates and an intermediate film disposed between the plurality of glass plates are stacked, when attached to a vehicle, the vehicular laminated glass is disposed between a vehicle-inner side and a vehicle-outer side of the vehicle, wherein the vehicular laminated glass comprises:
a first region having a colored layer disposed along an upper edge of the vehicular laminated glass with reference to an orientation of the vehicle to which the vehicular laminated glass is attached; and
a second region disposed lower than the first region,
wherein the first region comprises:
a region A having a light scattering layer; and
a region B not having the light scattering layer,
wherein:
the region A has a visible light transmittance ranging from 0.7% to 32%, a visible light reflectance ranging from 0.5% to 10%, and a vehicle-inner side visible light diffuse reflectance ranging from 3% to 45%, and
the light scattering layer is arranged at a vehicle-inner side relative to the colored layer.

2. The vehicular laminated glass according to claim 1, wherein in the region B, with regard to a*, b*, and C* represented in CIE L*a*b* color space, a value a* is in a range of −55 to −5, a value b* is in a range of −30 to −3, and a value C* expressed by an Expression 1, $$C^* = \sqrt{(a^*)^2 + (b^*)^2} \qquad (1)$$

is in a range of 20 to 60.

3. The vehicular laminated glass according to claim 2, wherein a difference between a value C* in the region A and a value C* in the region B is 10 or less.

4. The vehicular laminated glass according to claim 1, comprising two or more light scattering layers overlapping each other.

5. The vehicular laminated glass according to claim 1, wherein in at least the region A, an anti-reflection coating is provided on a vehicle-inner side principal surface of one of the glass plates arranged at a vehicle-innermost side.

6. The vehicular laminated glass according to claim 1, wherein the light scattering layer includes a first transparent layer, a reflection layer, and a second transparent layer, which are stacked in this order from a vehicle-outer side to the vehicle-inner side, the first transparent layer being formed with an uneven structure on a surface thereof, the reflection layer being formed on the uneven structure, and the second transparent layer being formed on the reflection layer.

7. The vehicular laminated glass according to claim 6, wherein the uneven structure has an arithmetic mean height Sa of 0.1 μm to 20 μm and a maximum height Sz of 50 μm or less.

8. The vehicular laminated glass according to claim 1, wherein the light scattering layer has a surface resistivity of 1 Ω/sq to $1 \times 10^6$ Ω/sq.

9. The vehicular laminated glass according to claim 1, wherein:
the first region includes a region in which a visible light transmittance changes, and
the light scattering layer is not provided in the region in which the visible light transmittance changes.

10. The vehicular laminated glass according to claim 1, wherein in the region A, a vehicle-outer side visible light diffuse reflectance is 30% or less.

11. The vehicular laminated glass according to claim 10, wherein in the region A, the vehicle-inner side visible light diffuse reflectance is higher than the vehicle-outer side visible light diffuse reflectance.

12. The vehicular laminated glass according to claim 1, wherein the colored layer comprises a dye which is at least one selected from the group consisting of azo dyes and phthalocyanine dyes.

* * * * *